United States Patent
Chiu et al.

(10) Patent No.: US 7,120,759 B2
(45) Date of Patent: Oct. 10, 2006

(54) STORAGE SYSTEM AND METHOD FOR PRESTAGING DATA IN A CACHE FOR IMPROVED PERFORMANCE

(75) Inventors: Lawrence Yium-Chee Chiu, Cupertino, CA (US); Archana Shyamsunder Samtani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 10/652,997

(22) Filed: Aug. 29, 2003

(65) Prior Publication Data

US 2005/0050279 A1    Mar. 3, 2005

(51) Int. Cl.
*G06F 12/00*    (2006.01)
(52) U.S. Cl. ...................................... 711/147
(58) Field of Classification Search ............... None
See application file for complete search history.

(56) References Cited

U.S. PATENT DOCUMENTS

| | | |
|---|---|---|
| 4,780,808 A | 10/1988 | Moreno et al. |
| 5,426,761 A | 6/1995 | Cord et al. |
| 6,185,659 B1 | 2/2001 | Milillo et al. |
| 6,260,115 B1 | 7/2001 | Permut et al. |
| 6,345,338 B1 | 2/2002 | Milillo et al. |
| 6,449,697 B1 | 9/2002 | Beardsley et al. |

2002/0178331 A1    11/2002 Beardsley et al.

FOREIGN PATENT DOCUMENTS

JP    3062148 A    3/1991

OTHER PUBLICATIONS

X. Shen et al., A Novel Application Devleopment Environment for Large-Scale Scientific Computations—Northwestern University, Evanston, IL, (XHSHEN@ECE.NWU.EDU).
IBM Technical Disclosure Bulletin, Multisequencing a Single Instruction Stream Meta High-End Machine Operations of the Instruction Processing Unit, vol. 36 No. 04 Apr. 1993.

*Primary Examiner*—Mano Padmanabhan
*Assistant Examiner*—Duc T Doan
(74) *Attorney, Agent, or Firm*—Khanh Q. Tran; Edmund H. Mizumoto

(57) ABSTRACT

A storage system and method for prestaging data in a cache based on relative changes in the frequency of data access and relative changes in the effectiveness of previous prestage operations. The relative changes in the frequency of data access are determined by storing statistics of data access to all regions in the system and comparing recent access statistics to the stored data. Access statistics include data location, I/O size and access frequency. The relative changes in the effectiveness of previous prestage operations are detected by recording the number of previous prestaging operations for a region, recording the number of I/O requests for data that has been prestaged, and dividing the number of I/O requests for previously prestaged data in a region during a time period by the number of previous prestage operations for the region during the same time.

18 Claims, 7 Drawing Sheets

STORAGE SYSTEM AND METHOD FOR PRESTAGING DATA IN A CACHE FOR IMPROVED PERFORMANCE

TECHNICAL FIELD

This invention relates to computer storage systems, and more particularly to a storage system and method for prestaging data in a cache memory based on relative changes in data access frequency and the effectiveness of previously prestaged data.

BACKGROUND OF THE INVENTION

Storage systems are one type of auxiliary computing storage devices where each system includes a large number of disk drive units. Large enterprise-level storage systems must have relatively high performance characteristics to meet the performance of high-performing application servers, file servers and database systems supported by the storage systems. In these storage systems, reading data from and writing data to the disk drive units are fairly time-consuming because of the lengthy mechanical operations within the disk drives. Examples of these operations include the arm movement in a disk drive or the rotational delay of the disk associated with getting a read/write head into a reading position or a writing position. To provide fast access to frequently accessed data, cache memories are typically used in the storage systems to temporarily hold this data. Since the read latency for data from a cache memory is less than that for a disk drive unit, the presence of the cache memory significantly improves the overall throughput of a storage system.

To further reduce the read latency, storage systems also use prestage operations to retrieve data from a disk drive into a cache before the data is retrieved by the next host I/O request. This can be done by the host issuing a prestage command, such as the extent channel command used in mainframe programs to indicate that a sequential access will take place, to the storage system to move data to cache. Alternatively, the storage system anticipates the next host I/O request and retrieves the data without any special hint or command from host application.

Since a cache memory has a much higher cost per byte than the data storage, its size is significantly smaller than the total storage. Resource management of the cache is typically done through a Least-Recently-Used (LRU) algorithm. The time duration since the last use of the data in the cache is an indication of its frequency of use. Data stored in the cache memory is aged from the point of time of its last use. Due to the limited capacity of the cache, data is continuously removed from the cache's address space as it becomes the least recently used data. While infrequently accessed data periodically enters the cache, it will tend to age and fall out of cache under the Least-Recently-Used algorithm.

Prior art prestage algorithms assume that data that is sequentially accessed is likely to be accessed in close temporal order or vice versa. In current storage systems, prestage algorithms use metadata to identify a perfect sequentially access I/O pattern to signal to the systems that a prestage operation is necessary. As an example, assume that LBAx, LBAx+y, LBAx+2y, LBAx+3y and so on are contiguous chunks of logical block addresses (LBAs) on a disk drive unit. There are different ways how the host can access the data, which affect the prestage algorithms as a result.

If the order of accesses is LBAX, LBAx+y, LBAx+2y and LBAx+3y, the storage system will prestage LBAx+2y and LBAx+3y only after LBAX, LBAx+y and more perfectly sequential data are accessed one following the other.

If the order of accesses is LBAx, LBAx+2y, LBAx+y and LBAx+3y, the storage system will fail to prestage LBAx+3y after LBAx is accessed.

If the order of accesses is LBAx, LBAx+2y, LBAx+4y, LBA+6y and so on, the storage system will also fail to issue any prestage in the region at all.

The size of the metadata associated with perfectly sequential access data is limited to the size of the memory in the storage systems. This configuration limits the overall accuracy and comprehensiveness of the recorded metadata. Since the gap between the size of the metadata memory in the storage system and its total storage capacity is growing rapidly, the recorded metadata does not accurately represent the I/O behavior.

U.S. Pat. No. 6,44,697 describes a method for prestaging data into a cache to prepare for data transfer operations. The method determines addressable locations of the data to be cached and generates a data structure capable of indicating contiguous and non-contiguous addressable locations in the storage system. A prestage command then causes the data at the addressable locations in the data structure to be prestaged into the cache. This prestage method does not take into consideration relative changes in the data access frequency and relative improvements in previous prestage operations.

U.S. Pat. No. 6,260,115 describes a method for prestaging data in a storage system by detecting a sequential access pattern and then prestaging a number of data tracks ahead of the current request based on the available storage. Data accesses are maintained in a list in the most-recently-used order from which sequential access patterns are detected. A key disadvantage of this method is that its benefits are realized only if there is a perfect sequentiality in the I/O stream.

Therefore, there remains a need for a storage system and method for efficiently prestaging data without the drawbacks of the prior art methods described above.

SUMMARY OF THE INVENTION

It is an object of the present invention to provide a storage system capable of prestaging data in a cache memory based on relative changes in the frequency of access to data in a region and in the effectiveness of prior prestaging operations.

It is another object of the invention to provide a method for prestaging data in a cache memory based on relative changes in the frequency of access to data in a region and in the effectiveness of prior prestaging operations.

It is yet another object of the invention to provide a storage system and method for prestaging data in which relative changes in the frequency of data access are determined based on access statistics of the storage regions. Access statistics preferably include data location, I/O size and access frequency.

It is still another object of the invention to provide a storage system and method for prestaging data in which relative changes in the effectiveness of previous prestage operations are determined based on information concerning the prestaged data and host requests for the prestaged data.

To achieve these and other objects, the invention provides a method for prestaging data in a storage system having a cache that includes: (a) determining a relative change in the frequency of data access for a storage region in the system; (b) determining a relative change in the effectiveness of previous prestage operations; and (c) determining whether to prestage data in the cache and the amount of data to prestage based on the determined relative change in access frequency, the determined relative change in the effectiveness and the size of last I/O access. The determination of a relative change in the data access frequency preferably includes the steps of: (a) maintaining statistics on data access to the region such as data location, I/O size and access frequency; and (b) comparing the statistics of recent I/O requests to the maintained statistics to determine relative changes in the access frequency for the region.

The determination of a relative change in the effectiveness of previous prestage operations preferably includes: (a) recording the number of previous prestaging operations of data for the region; (b) recording the number of I/O requests for data that has been prestaged for the region and is present in the cache; and (c) determining the relative change in the effectiveness by dividing the number of host I/O requests for previously prestaged data present in the region during a time period by the number of previous prestage operations for the region during the same period. If the relative change in the frequency of data access and the relative change in the effectiveness are both increasing, then data for the region is prestaged aggressively, i.e., a relatively large amount of data is prestaged. If either the relative change in the frequency of data access or the relative change in the effectiveness is increasing and the other measure is decreasing, then data for the region is prestaged only moderately. If both of these measures are decreasing, then data should be prestaged very minimally since there is little benefit in doing so.

Additional objects and advantages of the present invention will be set forth in the description which follows, and in part will be obvious from the description and the accompanying drawing, or may be learned from the practice of this invention.

DESCRIPTION OF THE PREFERRED EMBODIMENTS

The invention will be described primarily as a method for prestaging data in a storage system based on relative changes in data access frequency and the effectiveness of prior prestaging operations. However, persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the operations of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

The following key terms are now defined to facilitate the description of the invention that follows.

Track—A logical and contiguous collection of storage units.

Region—A collection of multiple tracks. Prestaging decisions are made in each individual region. A region within the physical volume can be fixed or variable sized.

Heat—The "heat" is a measurement of frequency of I/O access from host. A hot region indicates that a lot of I/O accesses were recently made regarding the region. Similarly, a cold region indicates that there hasn't been much I/O access in the region recently.

Effectiveness—The "effectiveness" is a measurement of the benefits resulting from past prestaging operations. It can be viewed as the return of the investment made in prestaging the data so far. The return on the prestaging is good if the prestaged data in the cache is requested by the host. This results in a lower latency of the host I/O operation. On the other hand, if the prestaged data is demoted from the cache without having a host read hit, then it has wasted system resources, such as CPU power, memory space and I/O bandwidth, in both staging the data and in keeping the data resident in cache. The benefits of prior prestaging decisions can be evaluated by determining whether the prestaged data has been accessed by the host or not.

Thermal Sensor—A component to gauge heat of a region.

Prestage Effectiveness Meter—A component to gauge the effectiveness of previous prestaging of data from a region.

Prestage Range—A range of LBAs used for the next prestage operation within a region.

Figure 1:
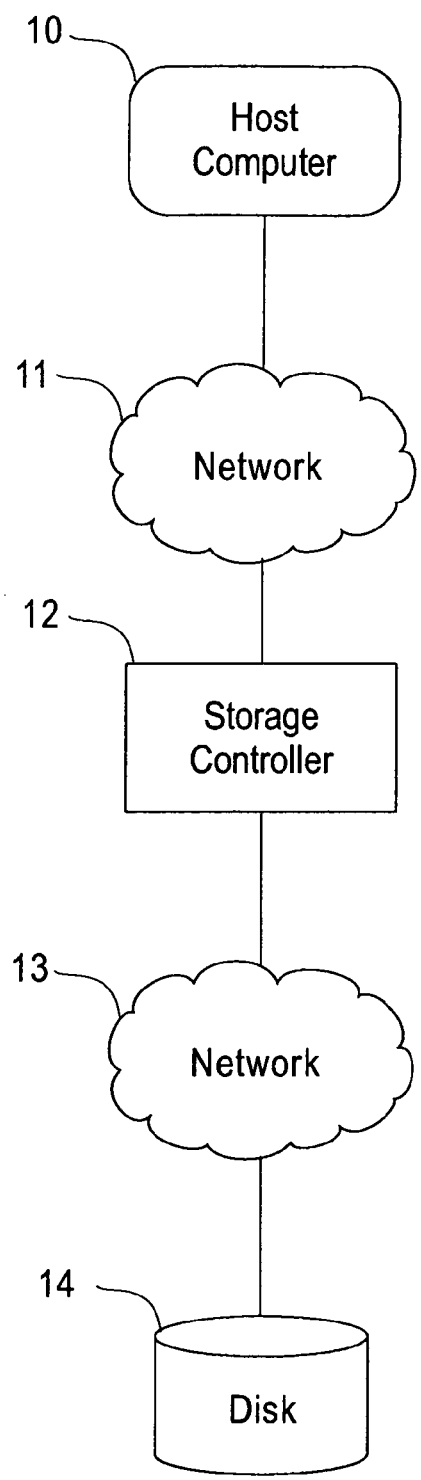
FIG. 1 is a block diagram illustrating a storage system environment in which data might be prestaged in accordance with the invention.

FIG. 1 is a block diagram representing a high-level view of a storage system in which data might be prestaged in accordance with the invention. A host computer system 10 is typically connected to a storage controller 12 through a network 11. As an example, the storage controller 12 may be a SAN Volume Controller manufactured by IBM Corporation and the network 11 may be a Fibre Channel storage area network. The storage controller 12 is connected to a storage disk 14 through a network 13. The storage disk 14 may be a disk array FAST-T600 offered by IBM Corporation and the network 13 may be another storage area network. The host computer 10 accommodates many software components, including an application program 15 which sends input and output operations to the storage controller 12. The application program 15 must provide the storage controller 12 with details of a data request such as the kind of operation involved, the storage volume that the operation is for, the logical block address of the first block of the data, and the size of the data to be processed. An operation might be a read of data from the disk 14 (an output operation) or a write of data to the disk 14 (an input operation). The storage controller 12 receives the input or output operations and processes them accordingly. This processing may or may not involve a staging operation or a destaging operation on the storage disk 14. On receipt of responses from the disk 14, the storage controller 12 returns the completion status of the operation as well as any applicable data to the application 15. The host computer 10 and the storage controller 12 may communicate with each other using a network protocol that is suitable for the network 11, e.g., the Fibre Channel protocol. The storage controller 12 and the disk 14 may communicate with each other using a network protocol applicable to the network 13 such as the Fibre Channel protocol. Data from the storage disk 14 might be prestaged in a high-speed cache memory typically implemented using volatile memory. The cache may reside anywhere in the input/output path between the application 15 on the host computer 10 and the disk 14.

Figure 2:
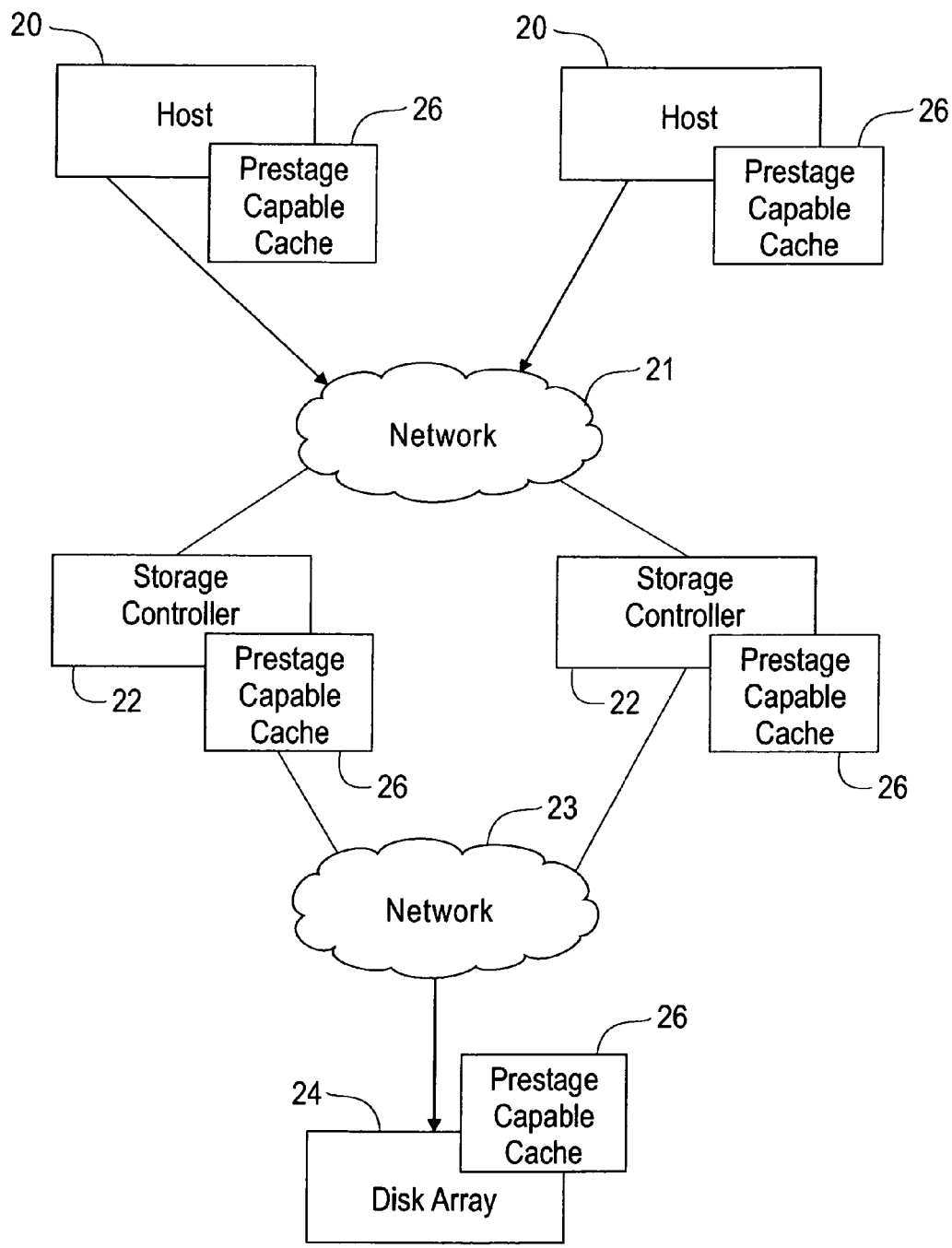
FIG. 2 is a block diagram illustrating different levels of the storage system in which the prestaging operations might be implemented in accordance with the invention.

FIG. 2 illustrates an expanded storage environment in which there are two host computers 20 that are connected to two storage controllers 22 through a network 21. The storage controllers 22 access data stored on a disk array 24 through a storage network 23. As shown in FIG. 2, one or more cache memories 26 might be implemented in any of the host computers 20, the storage controllers 22 or the data array 24. Since the storage controllers 20 have knowledge of the data requests issued by an application program on the host systems 20, they may prestage data from the disk array 24 in anticipation of subsequent requests for data before such requests actually arrive, regardless of where a cache 26 resides in the I/O path.

I/O retrieval time must be shortened to bridge the gap between processor performance and storage performance. When an application on a host system 21 requests data from storage, a storage controller 22 in the I/O path attempts to find the data in the cache 26. If this lookup fails, the storage controller 22 stages the data from the disk array 24 into the cache 26. This is a time consuming operation and thus, data cache misses are costly to the application. Since the measure of cache effectiveness is its miss ratio, and its complement—the hit ratio, cache performance can be improved by prestaging data before the data is requested by the host application. Such a prestaging takes advantage of the general spatial locality in data streams (i.e., perfect patterns) and moves data into the cache to benefit future I/O accesses. Perfect sequential access patterns are I/O access sequences that match the logical order of the data blocks in the system. Imperfect patterns are I/O sequences that are random within the region. The invention detects both perfect and imperfect sequential access patterns that can benefit from such prestaging.

Figure 3:
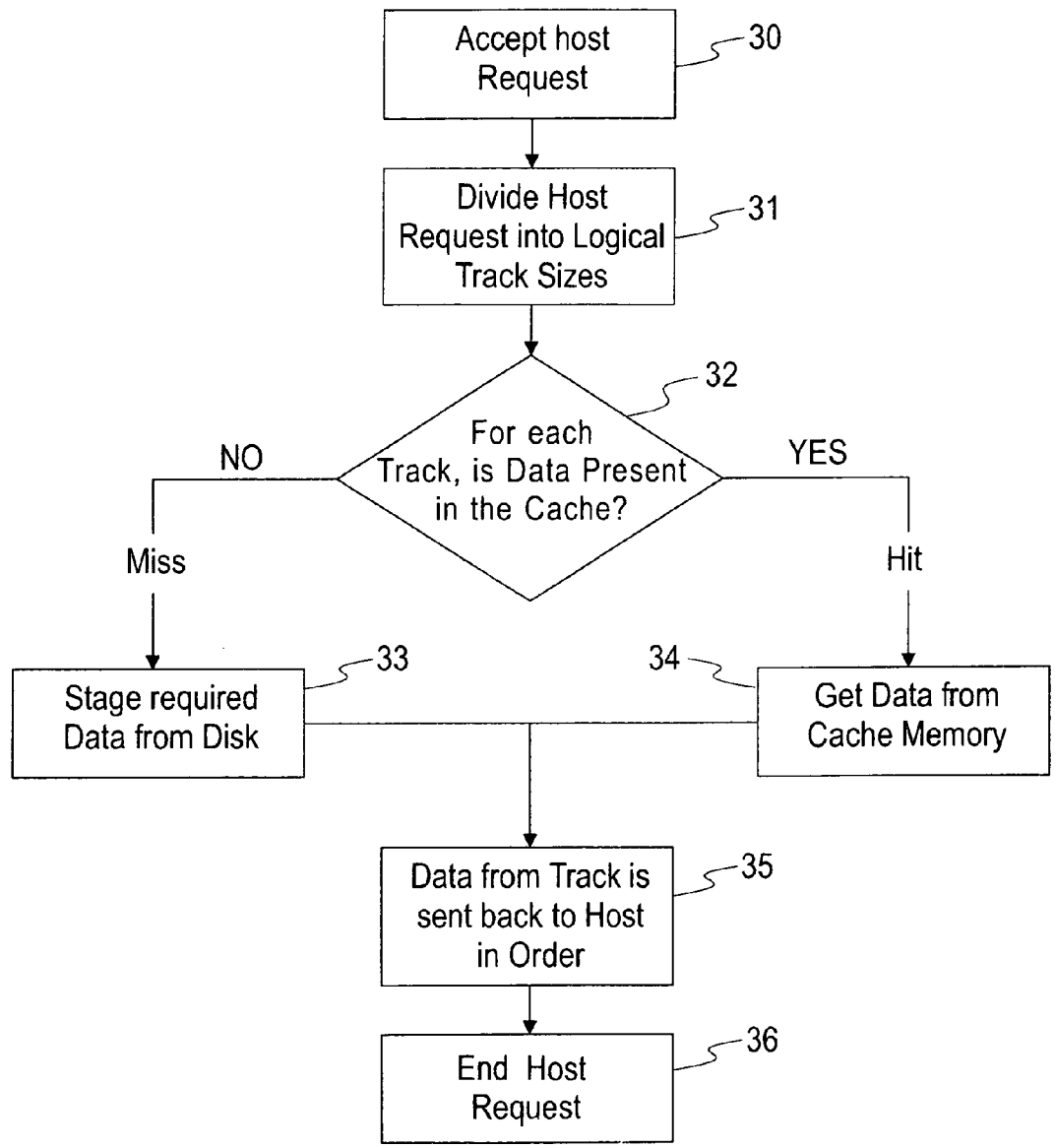
FIG. 3 is a flow chart showing a prior art method for prestaging data in a storage system.

FIG. 3 is a flow chart illustrating a typical prior art method for prestaging data in a storage system. At step 30, the storage controller accepts a data read request from a host application. At step 31, if the size of the requested data is larger than a track, the host request is logically divided into more than one track-sized requests and each of these requests is processed separately. At step 32, for each track, the storage controller checks to see if data is present in the cache. If data is present in the cache (a cache hit), then the storage controller retrieves the requested data from the cache at step 34. At step 35, the cache returns the retrieved track data to the host computer while maintaining the order with respect to the other tracks of the same read operation. If data is not in the cache (a cache miss), then the storage controller submits the request to the lower layers in the storage subsystem to obtain the data from the disk and stages this data in the cache, at step 33. Data is similarly returned to the host application in order at step 35. The host request operation is completed at step 36.

Figure 4:
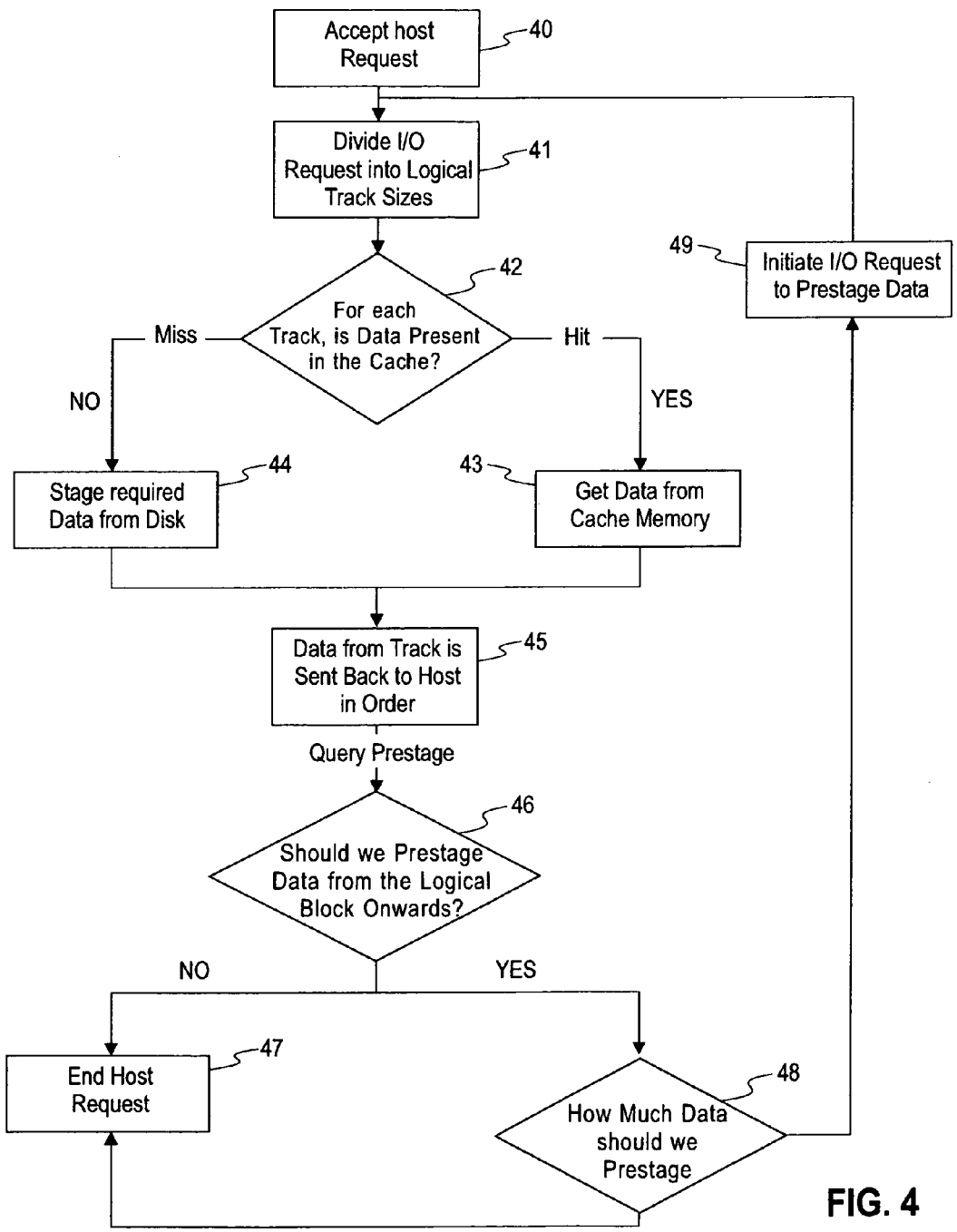
FIG. 4 is a flow chart showing a high level process for prestaging data in accordance with the invention.

FIG. 4 is a flowchart depicting a high-level process for prestaging data in accordance with the invention. At step 40, the storage controller accepts a data request from the host. The data request is divided into logical track sizes at step 41. At step 42, the storage system checks whether the requested data for each track size (e.g., 32 Kbytes) is present in the cache. If data is already in the cache, the storage controller fetches the data from the cache at step 43. Otherwise, it retrieves data from the disk at step 44. The retrieved data is next returned to the host at step 45. At step 46, the storage controller determines whether to prestage data from the end of the last request onward into the cache. If data is not going to be prestaged, then the host request processing ends at step 47. Otherwise, the storage controller determines the amount of data to be prestaged at step 48. This determination is based on the region's heat, the effectiveness from prior prestaging activities and the I/O size. The storage controller then initiates the prestage operation at step 49. The prestage operation is treated as a host request for data where the amount of data to be prestaged is first divided into logical track sizes at step 41.

Figure 5:
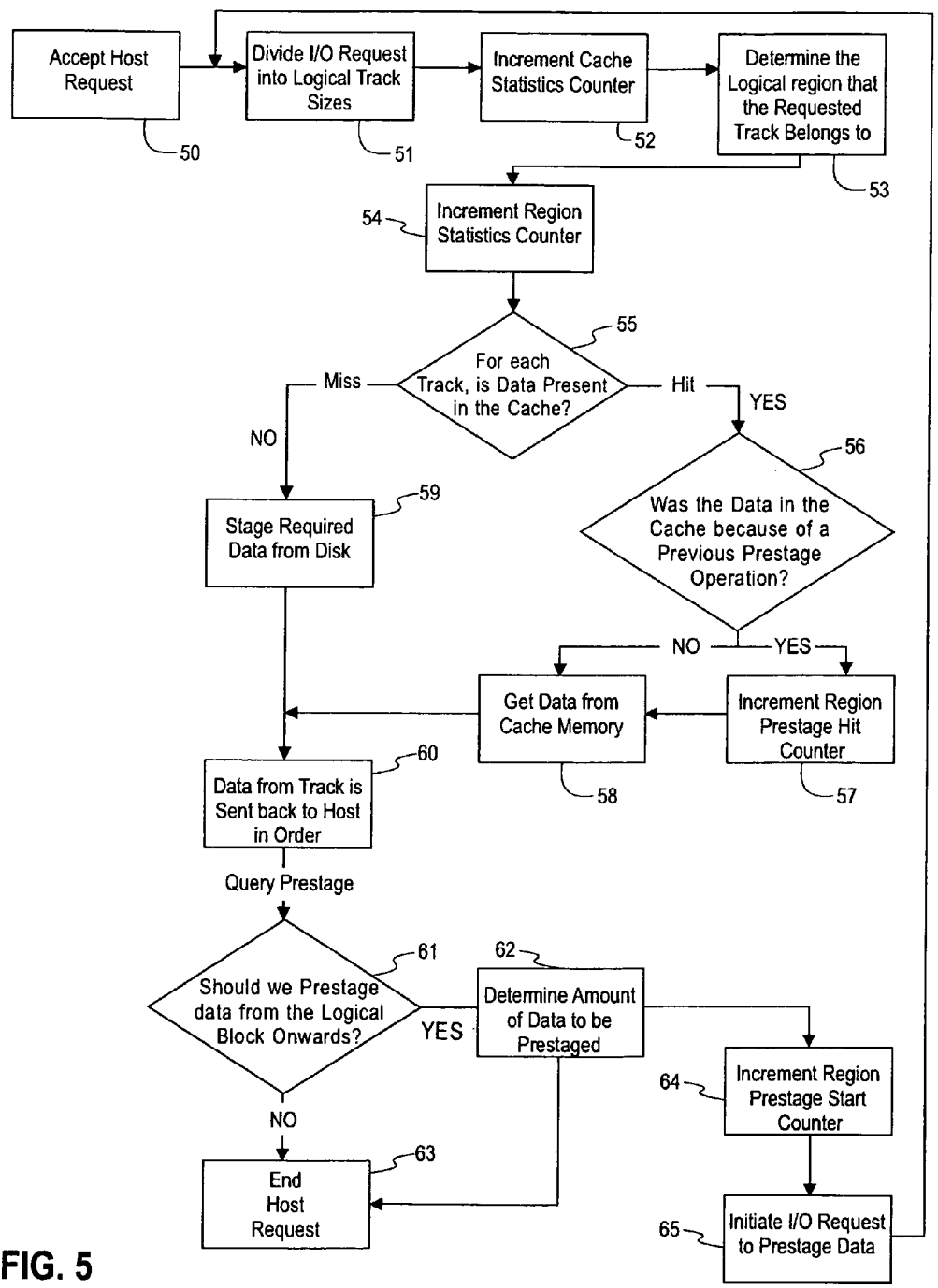
FIG. 5 is a flow chart showing a preferred embodiment of the process for prestaging data in accordance with the invention.

FIG. 5 is a flowchart showing the details of a preferred process for data prestaging in accordance with the invention. At step 50, a host request for data is received by the storage controller. At step 51, the request is divided into multiple logical track sizes. If the request is a data read operation, then a Cache Statistics Counter is incremented at step 52. The Cache Statistics Counter indicates the number of track read I/O operations. At step 53, the storage controller determines the logical region that the requested tracks belong to based on the volume ID and the logical address of the first block of the requested data. If the request is a read operation, then a Region Statistics Counter is incremented at step 54. This counter indicates the number of track-size reads in the logical region. At step 55, for each track, the storage controller determines whether the track data is present in the cache. If data is present in the cache (i.e., a cache hit), then the controller determines, at step 56, whether this data was in the cache due to a previous prestage operation. If data has previously been prestaged, then a Region Prestage Hit Counter is incremented at step 57. The Region Prestage Hit Counter indicates the number of data tracks that have been found in the cache due to previous prestage operations. The requested data is then retrieved from the cache at step 58. If the track data is not present in the cache, then the controller staged this data in the cache at step 59. The retrieved data is returned to the host system in the order of the track sizes at step 60.

At step 61, the storage controller determines whether to prestage in the cache data from the end of the last request onward. This determination is based on previous data accesses (i.e., heat) and the effectiveness of prior prestage operations. The heat of a logical region indicates the frequency of I/O accesses in the region by the host. If data is not to be prestaged at this point, then the processing of the host request ends at step 63. Otherwise, the storage controller determines the amount of data to be prestaged at step 62. This determination is based on the heat of the region, how effective the prestaging has been, and the size of the I/O request. Further details on the determination of the amount of data to be prestaged are described below in reference to FIG. 7. The storage controller next increments a Region Prestage Start Counter at step 64. This counter indicates the number of prestage operations that have been initiated for the current logical region. The controller then initiates the prestage operation at step 65. The prestage operation is treated as a host request for data where the amount of data to be prestaged is first divided into logical track sizes at step 51.

Figure 6:
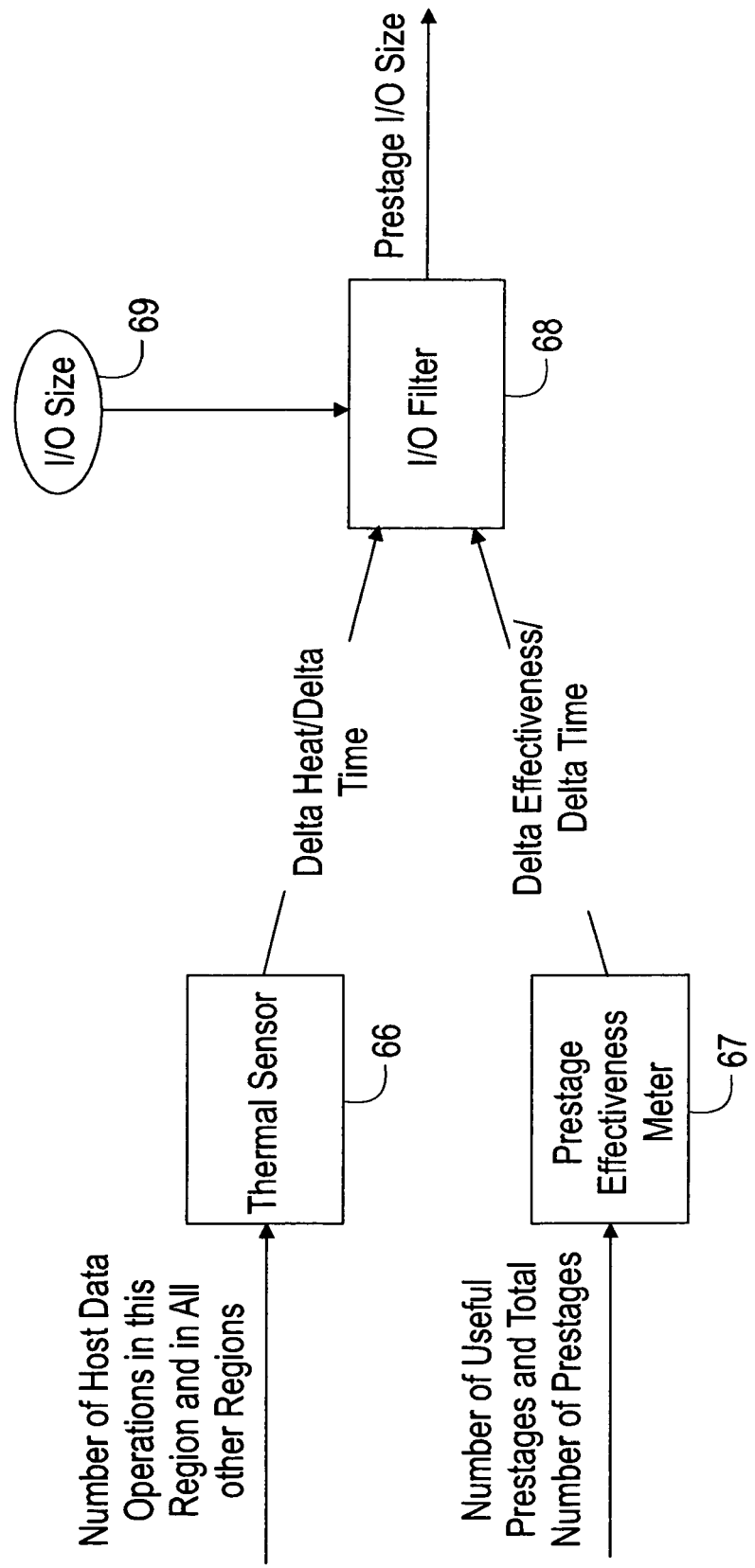
FIG. 6 is a flow chart showing a preferred embodiment of the process for including information on the effectiveness of previous prestaging and relative changes in data access frequency to determined future data prestaging operations.

The invention uses information on the region's heat and the success of prior prestage operations to effectively prestage in the cache for anticipated future I/O requests. FIG. 6 is a block diagram representing the processing of this information to generate future prestaging operations. In the preferred embodiment of the invention, there is conceptually a Thermal Sensor 66 for receiving information about the numbers of host data requests for different regions in the storage system. Based on this information, the Thermal Sensor 66 calculates the relative heat of a particular region, which is referred to as $\Delta$ heat/$\Delta$ time. In the preferred embodiment of the invention, the Thermal Sensor 66 calculates the region's relative heat based on the number of read operations for the region and the number of read operations for all regions in the system within a time period. The time period can be calculated in a number of ways: it can be a fixed time period when the heat of the particular region is sampled, it can be the period between n consecutive host I/O operations into this region, or it can be based on a predefined event.

For example, let Tn represent the n-th time slice. At time T1, the number of read operations into the region, i.e., the value of the Region Statistics Counter, is x. The total number of read operations into all the regions, i.e., the value of the Cache Statistics Counter, is y. Therefore, $\Delta$ heat/$\Delta$ time=(x−0)/(y−0)=x/y. At time T2, the number of read operations into the region is x'. The total number of read operations into all regions is y'. Therefore, $\Delta$ heat/$\Delta$ time=(x'−x)/(y'−y). A large value of $\Delta$ heat/$\Delta$ time suggests that an I/O stream is active on that region. By the principles of locality, a "hot" region would be a good candidate for a prestage operation.

FIG. 6 also shows a Prestage Effectiveness Meter 67 which receives information on the number of useful prestage operations and the total number of prestage operations. The Prestage Effectiveness Meter 67 calculates the effectiveness of previous prestaging of data which is referred to in the present description as $\Delta$ effectiveness/$\Delta$ time. The meter 67 uses the number of beneficial prestages (i.e., those that gets host read hits) versus the total number of prestages in the region within the time period, to measure the benefit of the previous prestaging. The first number is the value of the Region Prestage Hit Counter while the second number is the value of the Region Prestage Start Region. The time period can be calculated in a number of ways: it can be a fixed time period when the heat of regions is sampled, it can be the period between n consecutive host I/O operations into the region, or it can be based on a predefined event.

For example, let Tn represent the n-th time slice. At time T1, let the number of prestaged tracks in the region that got host read hits be x. The total number of prestage operations in that region is y. Therefore, $\Delta$ effectiveness/$\Delta$ time=(x−0)/(y−0)=x/y. At time T2, let the number of prestaged tracks in the region that got host read hits be x'. The total number of prestage operations in that region is y'. Therefore, $\Delta$ effectiveness/$\Delta$ time=(x'−x)/(y'−y). A large value of $\Delta$ effectiveness/$\Delta$ time indicates that the previous prestaging of data was effective and suggests that the system should continue to prestage data for this region. A low value indicates that prior prestage decisions have been ineffective and a corrective action must be taken regarding future prestaging operations. A prestage operation is effective when the first host request after the prestage operation accesses the prestaged data. This operation causes an increase in the prestage effectiveness. However, further host accesses to the prestaged data before it has been demoted from the cache do not increase regional effectiveness as the prior host access would have cached the data if it had not been a cache hit.

The information generated by the Thermal Sensor 66 and Prestage Effectiveness Meter 67, i.e., $\Delta$ heat/$\Delta$ time and $\Delta$ effectiveness/$\Delta$ time, is sent to an I/O Filter 68 to determine whether data should be prestaged for this region and if so the size of the I/O request to be prestaged. The policy for determining the future prestaging is preferably based on static values of the heat and effectiveness described above. The policy might compare the current heat and effectiveness with a previous heat gradient and effectiveness gradient to decide whether the region is "hotter" than before. The I/O filter 66 can then use this information to determine whether prestaging will be beneficial or not. Depending on the host I/O size 69 and the outputs of the Thermal Sensor 66 and the Prestage Effectiveness Meter 67, the I/O Filter 68 decides whether to generate a prestage request and the size of the I/O request.

Figure 7:
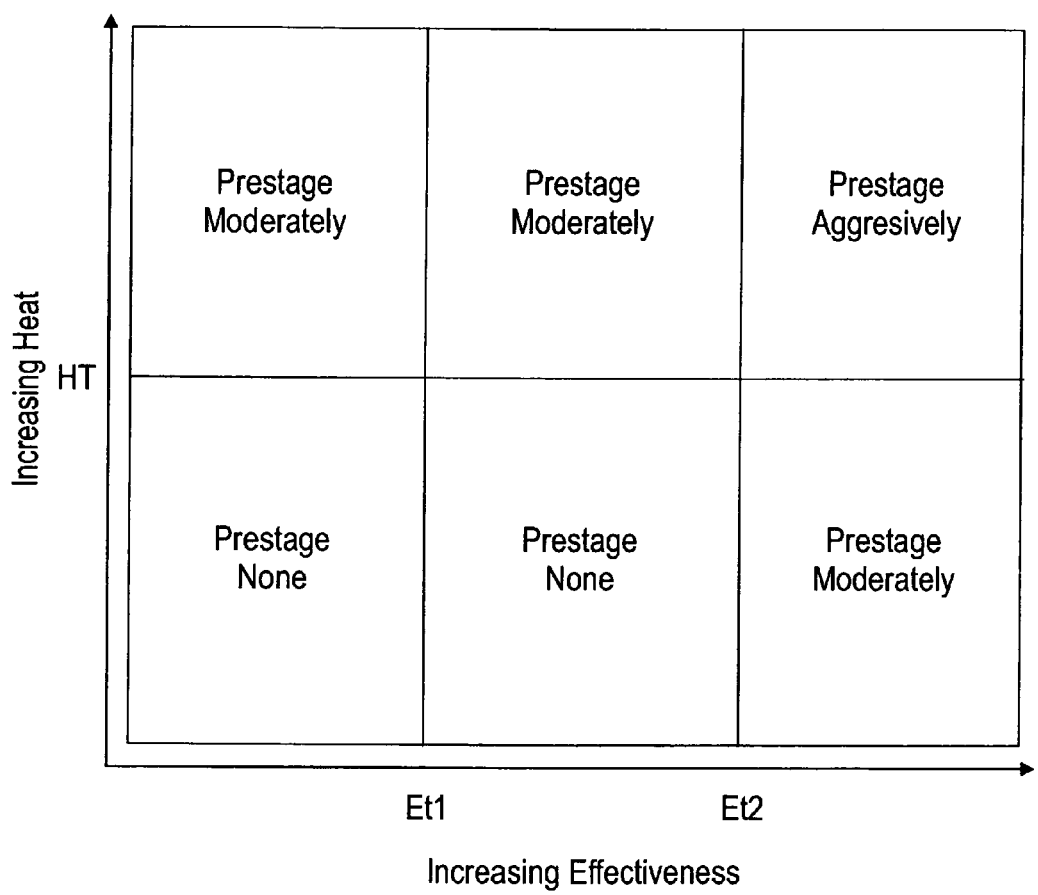
FIG. 7 is a chart showing a preferred policy for determining the amount of data for prestaging depending on a region's heat and the effectiveness of prior data prestaging.

FIG. 7 is a chart illustrating the relationship between a region's heat and the effectiveness of prestaging. Ht represents a static heat threshold. Et1 is a static lower effectiveness threshold. Et2 is a static higher effectiveness threshold. The values of Ht, Et1 and Et2 can be tuned for any give system. The decision whether to prestage data or not, given the values of heat and effectiveness, can be based on the kind of workloads currently handled by the system. For example, deciding not to prestage on heat values below the heat threshold except in instances when the prestage effectiveness is relatively high, prevents prestage operations for workloads that do not exhibit sufficient spatial locality.

Data prestaging consumes system resources, such as memory and computing time, and can even compete for these resources with host I/O operations. It is important that all resources consumed by prestage operations eventually have a overall positive impact on system behavior and also that the downside for any kind of workload or access pattern must be minimized. Preferably, the system resources are partitioned such that prestage operations would have accessed to only a percentage of the total available resources. This establishes a bound the total overall investment of system resource for the purpose of prestaging. Efficient and effective resource management also requires that any resource used by bad prestage investment, should be reclaimed by the system as soon as the information of bad decision is known. Memory resources used for maintaining statistics per region, can grow very big depending on the total storage size. Resource management of the statistics table can follow a simple replacement algorithm of statistics entries. The replacement algorithm can store some statistic table entries on storage based on most recent access and/or frequency of use so that at any given time, only a limited amount of memory is actually paged in to keep statistics.

While the present invention has been particularly shown and described with reference to the preferred embodiment, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for prestaging data in a storage system having a cache, the method comprising the steps of:
   determining a relative change in the frequency of data access for a storage region in the system;

determining a relative change in the effectiveness of previous prestage operations; and determining whether to prestage data in the cache and the amount of data to prestage based on the determined relative change in access frequency, the determined relative change in the effectiveness and the size of last I/O access, wherein if the relative change in the frequency of data access and the relative change in the effectiveness are both increasing, then data for the region is prestaged aggressively.

2. The method as recited in claim 1, wherein the step of determining a relative change in the frequency of data access includes the steps of:

maintaining statistics on data access to the region in a store, said statistics including data location, I/O size and access frequency; and comparing the statistics of recent I/O requests to the maintained statistics to determine the relative change in access frequency for the region.

3. The method as recited in claim 1, wherein the step of determining a relative change in the effectiveness of previous prestage operations comprises the steps of:

recording the number of previous prestaging operations of data for the region;

recording the number of I/O requests for data that has been prestaged for the region; and determining the relative change in the effectiveness by dividing the number of I/O requests for previously prestaged data in a region during a time period by the number of previous prestage operations for the region during the same time.

4. The method as recited in claim 1, wherein if the relative change in the frequency of data access is increasing and the relative change in the effectiveness is decreasing, then data for the region is prestaged moderately.

5. The method as recited in claim 1, wherein if the relative change in the frequency of data access is decreasing and the relative change in the effectiveness is increasing, then data for the region is prestaged moderately.

6. The method as recited in claim 1, wherein if the relative change in the frequency of data access and the relative change in the effectiveness are both decreasing, then data for the region is prestaged minimally.

7. A computer-program product for use with a storage system for prestaging data in the system, the computer-program product comprising:

a computer-readable medium;

means, provided on the computer-readable medium, for determining a relative change in the frequency of data access for a storage region in the system;

means, provided on the computer-readable medium, for determining a relative change in the effectiveness of previous prestage operations; and means, provided on the computer-readable medium, for determining whether to prestage data in the cache and the amount of data to prestage based on the determined relative change in access frequency, the determined relative change in the effectiveness and the size of last I/O access, wherein if the relative change in the frequency of data access and the relative change in the effectiveness are both increasing, then data for the region is prestaged aggressively.

8. The computer-program product as recited in claim 7, wherein the means for determining a relative change in the frequency of data access includes:

means, provided on the computer-readable medium, for maintaining statistics on data access to the region in a store, said statistics including data location, I/O size and access frequency; and means, provided on the computer-readable medium, for comparing the statistics of recent I/O requests to the maintained statistics to determine the relative change in access frequency for the region.

9. The computer-program product as recited in claim 7, wherein the means for determining a relative change in the effectiveness of previous prestage operations comprises:

means, provided on the computer-readable medium, for recording the number of previous prestaging operations of data for the region;

means, provided on the computer-readable medium, for recording the number of I/O requests for data that has been prestaged for the region; and means, provided on the computer-readable medium, for determining the relative change in the effectiveness by dividing the number of I/O requests for previously prestaged data in a region during a time period by the number of previous prestage operations for the region during the same time.

10. The computer-program product as recited in claim 7, wherein if the relative change in the frequency of data access is increasing and the relative change in the effectiveness is decreasing, then data for the region is prestaged moderately.

11. The computer-program product as recited in claim 7, wherein if the relative change in the frequency of data access is decreasing and the relative change in the effectiveness is increasing, then data for the region is prestaged moderately.

12. The computer-program product as recited in claim 7, wherein if the relative change in the frequency of data access and the relative change in the effectiveness are both decreasing, then data for the region is prestaged minimally.

13. A storage system comprising:

a cache for prestaging data;

means for determining a relative change in the frequency of data access for a storage region in the system;

means for determining a relative change in the effectiveness of previous prestage operations; and means for determining whether to prestage data in the cache and the amount of data to prestage based on the determined relative change in access frequency, the determined relative change in the effectiveness and the size of last I/O access, wherein if the relative change in the frequency of data access and the relative change in the effectiveness are both decreasing, then data for the region is prestaged minimally.

14. The system as recited in claim 13, wherein the means determining a relative change in the frequency of data access comprises:

means for maintaining statistics on data access to the region in a store, said statistics including data location, I/O size and access frequency; and means for comparing the statistics of recent I/O requests to the maintained statistics to determine the relative change in access frequency for the region.

15. The system as recited in claim 13, wherein the means for determining a relative change in the effectiveness of previous prestage operations comprises:

means for recording the number of previous prestaging operations of data for the region; means for recording the number of I/O requests for data that has been prestaged for the region; and means for determining the relative change in the effectiveness by dividing the number of I/O requests for previously prestaged data in a region during a time period by the number of previous prestage operations for the region during the same time.

16. The system as recited in claim 13, wherein if the relative change in the frequency of data access and the relative change in the effectiveness are both increasing, then data for the region is prestaged aggressively.

17. The system as recited in claim 13, wherein if the relative change in the frequency of data access is increasing and the relative change in the effectiveness is decreasing, then data for the region is prestaged moderately.

18. The system as recited in claim 13, wherein if the relative change in the frequency of data access is decreasing and the relative change in the effectiveness is increasing, then data for the region is prestaged moderately.

* * * * *